United States Patent
Raghavan et al.

(10) Patent No.: US 12,512,889 B2
(45) Date of Patent: Dec. 30, 2025

(54) BEAMFORMING METHOD AND SYSTEM FOR IMPLEMENTING

(71) Applicant: Rakuten Mobile, Inc., Tokyo (JP)

(72) Inventors: Sathyadeep Raghavan, Tokyo (JP); Hrishikesh Pimpalkar, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 262 days.

(21) Appl. No.: 18/546,099

(22) PCT Filed: Dec. 22, 2022

(86) PCT No.: PCT/US2022/053851
§ 371 (c)(1),
(2) Date: Aug. 11, 2023

(87) PCT Pub. No.: WO2024/136867
PCT Pub. Date: Jun. 27, 2024

(65) Prior Publication Data
US 2025/0015855 A1    Jan. 9, 2025

(51) Int. Cl.
*H04B 7/06* (2006.01)
(52) U.S. Cl.
CPC .................................. *H04B 7/0623* (2013.01)
(58) Field of Classification Search
CPC ... H04B 7/06; H04B 7/08; H04B 7/14; H04B 7/155; H04B 7/056; H04B 7/0617; H04B 7/0623; H04B 7/0632; H04B 10/564; H04B 17/309; H04L 5/00; H04L 5/14; H04W 16/28; H04W 24/02; H04W 24/10; H04W 28/18; H04W 48/08; H04W 52/24; H04W 52/34; H04W 72/08; H04W 76/27; H04W 88/04
USPC ................ 375/219, 260, 262, 267, 295, 316
See application file for complete search history.

(56) References Cited

U.S. PATENT DOCUMENTS

| | | | |
|---|---|---|---|
| 10,608,729 B1 * | 3/2020 | Youtz ................... | H04W 24/02 |
| 2019/0158162 A1 | 5/2019 | Ryu et al. | |
| 2022/0264468 A1 * | 8/2022 | Ebadi Shahrivar ... | H04W 24/08 |

* cited by examiner

*Primary Examiner* — Shawkat M Ali
(74) *Attorney, Agent, or Firm* — HAUPTMAN HAM, LLP

(57) ABSTRACT

An aspect of this description relates to a method of beamforming in a telecommunication network. The method includes controlling an antenna array in a base station to output a default beamforming signal, wherein outputting the default beamforming signal consumes a first amount of power. The method includes collecting key performance indicator (KPI) data for a plurality of KPIs. The method includes determining whether each of the plurality of KPIs has a value below a corresponding first threshold of a plurality of first thresholds. The method includes controlling the antenna array to output a second beamforming signal, different from the first beamforming signal, in response to a determination that the value of each of the plurality of KPIs is below the corresponding first threshold of the plurality of first thresholds, wherein outputting the second beamforming signal consumes a second amount of power different from the first amount of power.

20 Claims, 7 Drawing Sheets

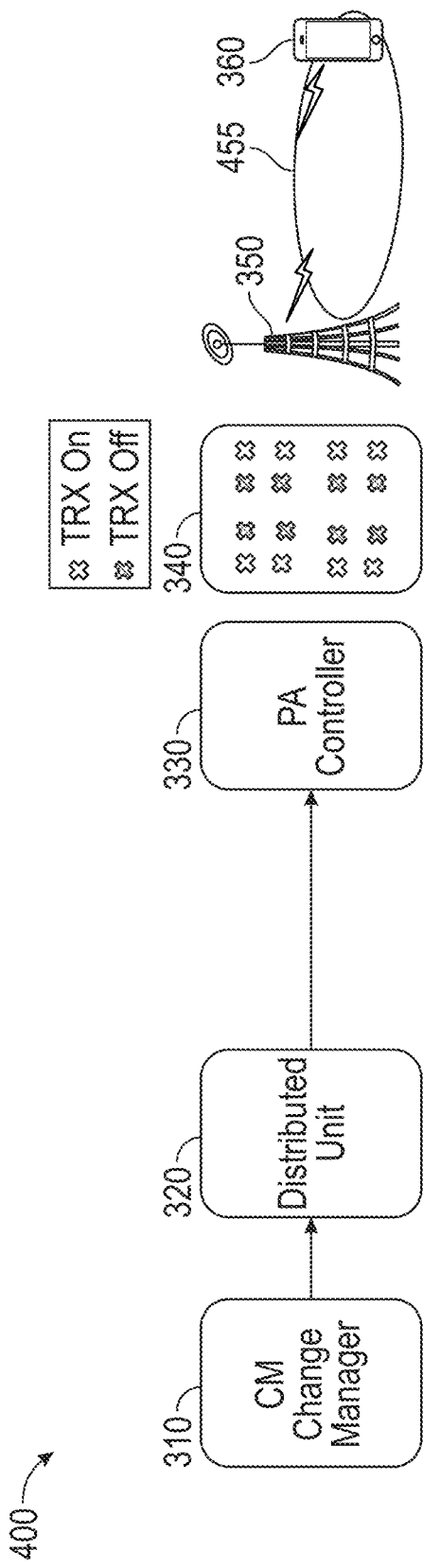
FIG. 4A
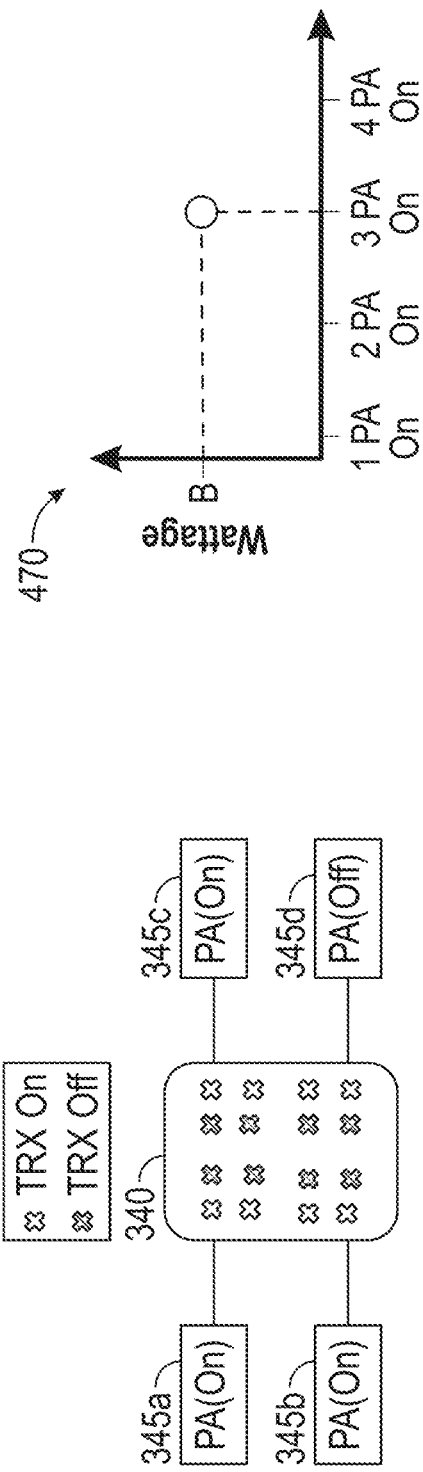
FIG. 4B
FIG. 4C

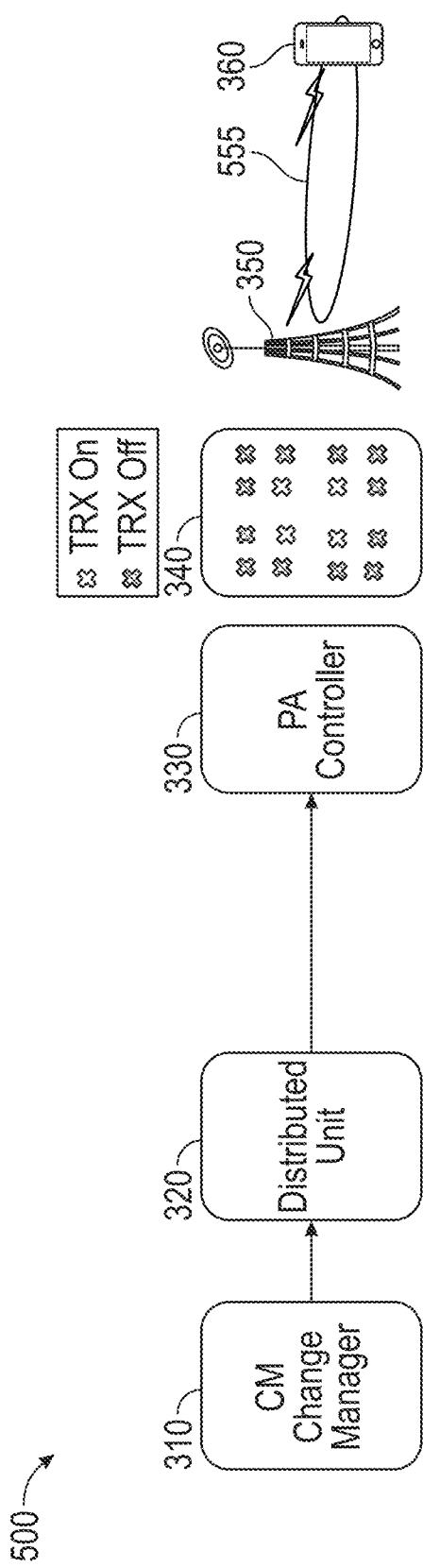
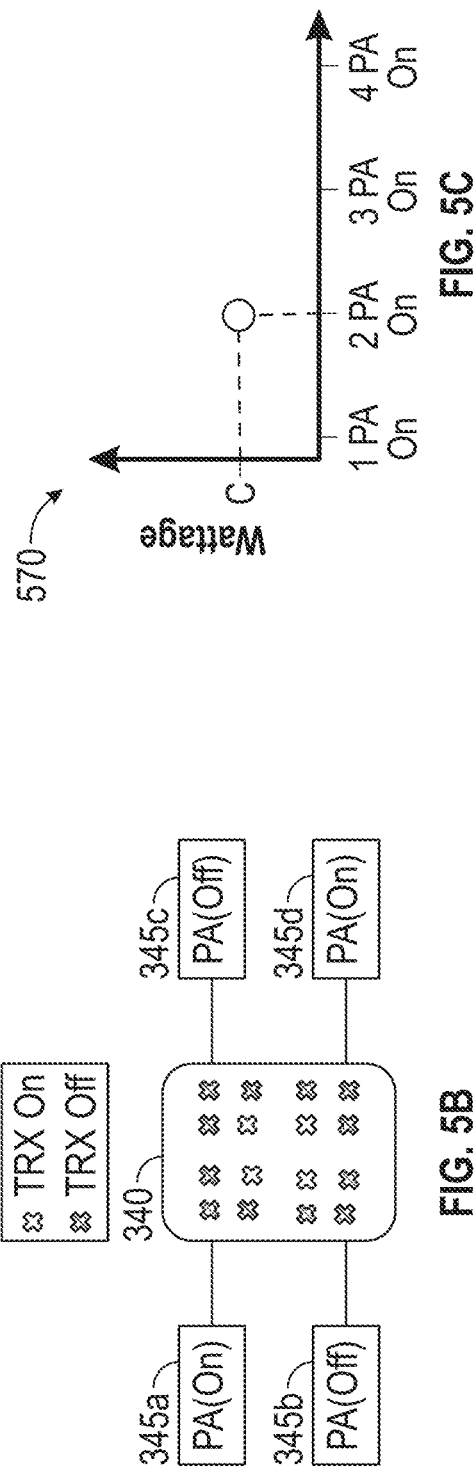

BEAMFORMING METHOD AND SYSTEM FOR IMPLEMENTING

RELATED APPLICATIONS

The present application is a National Phase of International Application No. PCT/US2022/053851, filed Dec. 22, 2022.

TECHNICAL FIELD

This description relates to a beamforming method and a system for implementing the beamforming method.

BACKGROUND

As telecommunication networks increase in size and complexity, power consumption by base station equipment has increased. Telecommunication networks often operate using multiple different generations a one time. For example, some telecommunication networks simultaneously support communication using fourth-generation (4G), long term evolution (LTE), and fifth-generation (5G). Maintaining each of these generations means more equipment is used and more power is consumed.

Telecommunication networks also utilize beamforming to shape signals from antennae in base stations to help to improve communication speed between user equipment (UE), such as mobile phones, and the base station. Beamforming includes multiple different shapes of signals from an antenna. Broad beam beamforming has a larger coverage area, but provides slower data exchange between the UE and the base station. Narrow beam beamforming has a smaller coverage area, but provides faster data exchange between the UE and the base station.

SUMMARY

An aspect of this description relates to a method of beamforming in a telecommunication network. The method includes controlling an antenna array in a base station to output a default beamforming signal, wherein outputting the default beamforming signal consumes a first amount of power. The method further includes collecting key performance indicator (KPI) data for a plurality of KPIs associated with telecommunication network. The method further includes determining whether each of the plurality of KPIs has a value below a corresponding first threshold of a plurality of first thresholds. The method further includes controlling the antenna array in the base station to output a second beamforming signal, different from the first beamforming signal, in response to a determination that the value of each of the plurality of KPIs is below the corresponding first threshold of the plurality of first thresholds, wherein outputting the second beamforming signal consumes a second amount of power different from the first amount of power.

An aspect of this description relates to a system for beamforming in a telecommunication network. The system includes a non-transitory computer readable medium configured to store instructions thereon. The system further includes a processor connected to the non-transitory computer readable medium. The processor is configured to execute the instructions for controlling an antenna array in a base station to output a default beamforming signal, wherein outputting the default beamforming signal consumes a first amount of power. The processor is configured to execute the instructions for collecting key performance indicator (KPI) data for a plurality of KPIs associated with telecommunication network. The processor is configured to execute the instructions for determining whether each of the plurality of KPIs has a value below a corresponding first threshold of a plurality of first thresholds. The processor is configured to execute the instructions for controlling the antenna array in the base station to output a second beamforming signal, different from the first beamforming signal, in response to a determination that the value of each of the plurality of KPIs is below the corresponding first threshold of the plurality of first thresholds, wherein outputting the second beamforming signal consumes a second amount of power different from the first amount of power.

An aspect of this description relates to a non-transitory medium configured to store instructions for causing a processor to control an antenna array in a base station to output a default beamforming signal, wherein outputting the default beamforming signal consumes a first amount of power. The instructions are further configured to cause the processor to collect key performance indicator (KPI) data for a plurality of KPIs associated with telecommunication network. The instructions are further configured to cause the processor to determine whether each of the plurality of KPIs has a value below a corresponding first threshold of a plurality of first thresholds. The instructions are further configured to cause the processor to control the antenna array in the base station to output a second beamforming signal, different from the first beamforming signal, in response to a determination that the value of each of the plurality of KPIs is below the corresponding first threshold of the plurality of first thresholds, wherein outputting the second beamforming signal consumes a second amount of power different from the first amount of power.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 4A is a view of a flow of operations for beamforming based on a second power level in accordance with some embodiments.

FIG. 4B is a schematic view of an antenna performing beamforming based on the second power level in accordance with some embodiments.

FIG. 4C is a graph of a power consumption of an antenna performing beamforming based on the second power level in accordance with some embodiments.

FIG. 5A is a view of a flow of operations for beamforming based on a third power level in accordance with some embodiments.

FIG. 5B is a schematic view of an antenna performing beamforming based on the third power level in accordance with some embodiments.

FIG. 5C is a graph of a power consumption of an antenna performing beamforming based on the third power level in accordance with some embodiments.

DETAILED DESCRIPTION

Figure 1:
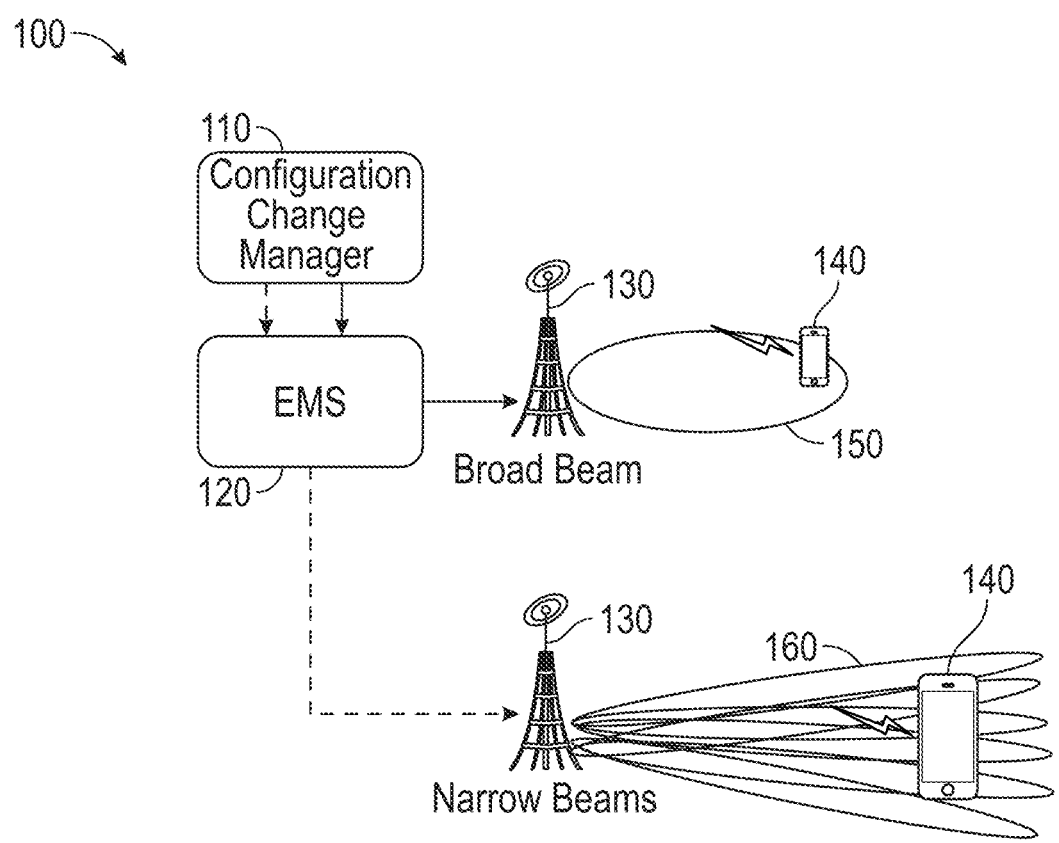
FIG. 1 is a schematic view of a portion of a telecommunication network in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As electronic devices and electric vehicles proliferate in society, demands on power supply are increasing. As a result, power costs and a risk of blackouts are also increasing. Operating a telecommunication network in a more power efficient manner helps to reduce operating costs for a network provider and to helps reduce the risk of blackouts. However, the network provider also considers the satisfaction of customers. Merely reducing power consumption universally would reduce signal quality from base stations of the telecommunication network. In turn, data transfer speeds within the telecommunication network would be reduced and customer satisfaction would also decline.

This description provides a method and a system for beamforming in order to help conserve power. Key performance indicators (KPIs) are measured to determine the usage of a base station of the network. Based on the KPIs, a controller is able to perform beamforming to provide customers with sufficient data transfer rates while also considering reduction of power consumption. The ability to automatically adjust the beamforming implemented by antennae in the base station helps to improve power efficiency in the telecommunication network while also maintaining customer satisfaction. This, in turn, reduces operating cost by the network provider and reduces a risk of blackout without significantly impacting the service provided to the customer.

FIG. 1 is a schematic view of a portion of a telecommunication network 100 in accordance with some embodiments. The telecommunication network 100 includes a configuration change manager 110 configured to determine which beamforming scheme to utilize for a base station 130. An element management system (EMS) 120 is configured to receive instructions from the configuration change manager 110 and to communicate with the base station 130 to implement the instructed beamforming scheme. The base station 130 is configured to receive instructions from the EMS 120 and to output a signal based on the instructions to allow communication between the base station 130 and user equipment (UE) 140, such as a mobile phone. The base station 130 is capable of outputting a broad beam signal 150. The base station 130 is also capable of outputting multiple narrow beam signals 160. FIG. 1 includes two depictions of the base station 130, one outputting the broad beam signal 150 and one outputting multiple narrow beam signals 160. These are depictions of a same base station 130. That is, the base station 130 is capable of outputting both types of signals based on the instructions from the EMS 120. The two depictions of the base station 130 are merely to assist with understanding differences between a broad beam signal 150 and multiple narrow beam signals 160.

The configuration change manager 110 is configured to receive information related to KPIs for the base station 130. The configuration change manager 110 is further configured to determine a beamforming arrangement to utilize at the base station 130 in order to provide sufficient signal strength to the UE 140 to maintain customer satisfaction while also efficiently consuming power at the base station 130. In some embodiments, the configuration change manager 110 is configured to compare the KPIs with threshold values in order to determine the beamforming arrangement for the base station 130. In some embodiments, the KPIs include one or more of physical resource blocks (PRB), radio resource control (RRC), reference signal received power (RSRP), reference signal received quality (RSRQ), block error rate (BLER), timing advance (TA), or other suitable KPIs. Different threshold values for different KPIs are usable to determine the type of beamforming arrangement selected by the configuration change manager 110. Threshold values for the KPIs are discussed below in more detail, in accordance with some embodiments.

The EMS 120 is configured to control power amplifiers (PAs) connected to one or more antennae within the base station 130. The EMS 120 is configured to control an operating voltage supplied to the PAs in order to turn the PAs ON or OFF in order to adjust the beamforming arrangement from a corresponding antenna in the base station 130. While the telecommunication network 100 is shown as including two different beamforming arrangements, i.e., broad beam 150 and multiple narrow beams 160, one of ordinary skill in the art would understand that the use of two beamforming arrangements is merely an example. In some embodiments, the telecommunication network 100 is capable of more than two different beamforming arrangements.

Figure 2:
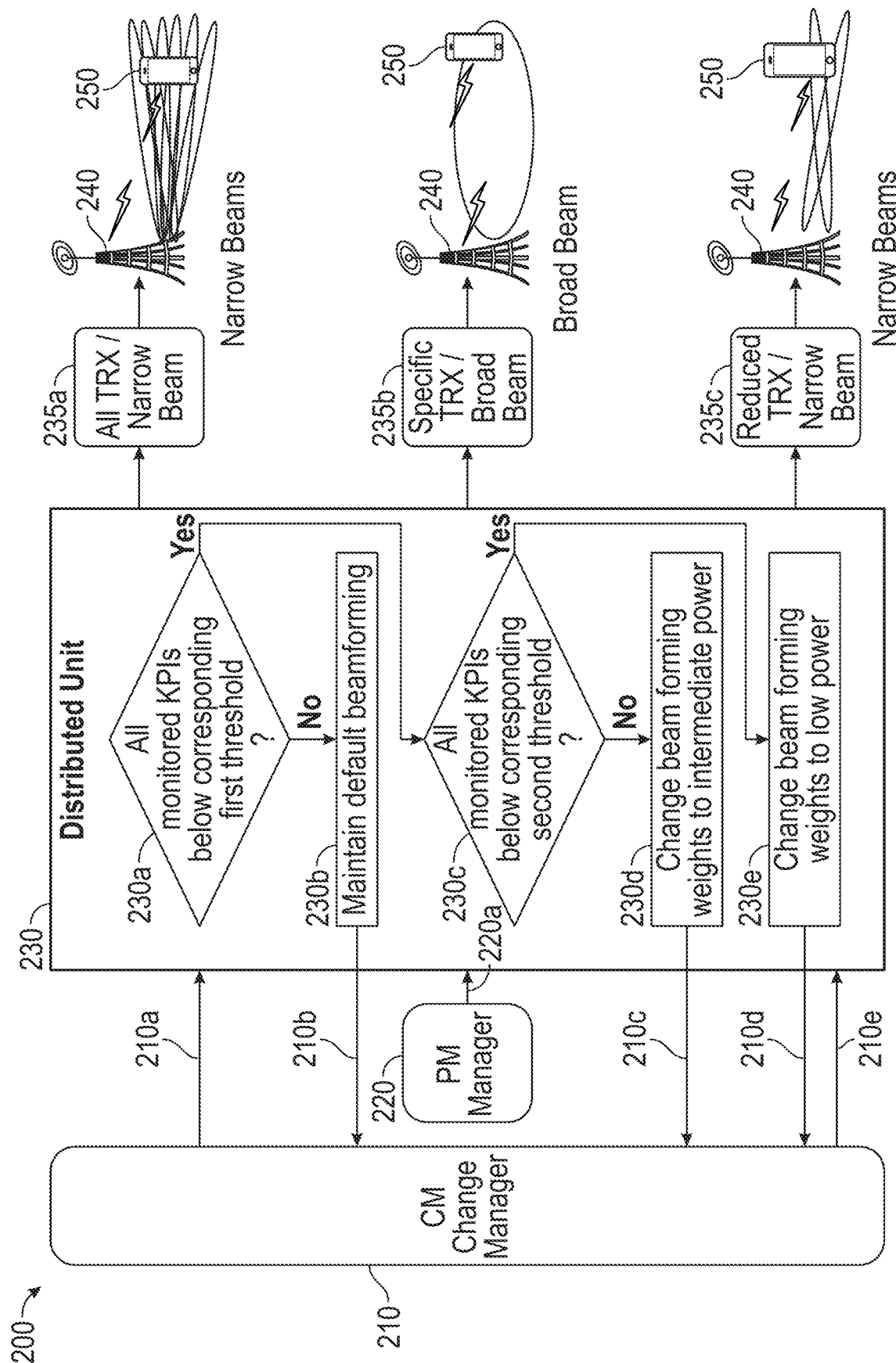
FIG. 2 is a view of a flow of operations of a portion of a telecommunication network in accordance with some embodiments.

FIG. 2 is a view of a flow of operations of a portion of a telecommunication network 200 in accordance with some embodiments. The telecommunication network 200 includes a central module (CM) change manager 210 configured to provide instructions to a distributed unit 230 for controlling beamforming arrangements in a base station 240. The telecommunication network 200 further includes a peripheral module (PM) manager 220 configured to collect KPI data for the base station 240 and provide the KPI data to the distributed unit 230. The distributed unit 230 is configured to receive instructions for beamforming arrangements from the CM change manager 210 and KPI data from the PM manager 220. Based on the beamforming arrangement instructions, the distributed unit 230 is configured to provide instructions to the base station 240 to turn ON or OFF PAS within the base station 240 to implement the instructed beamforming arrangement. Based on the KPI data, the distributed unit 230 is configured to provide recommendations to the CM change manager 210 for adjusting a beamforming arrangement for the base station 240. In some embodiments, the combined functionality of the CM change manager 210 and the PM manager 220 is similar to the functionality of the configuration change manager 110 (FIG. 1). In some embodiments, the functionality of the distributed unit 230 is similar to the functionality of the EMS 120 (FIG. 1). In some embodiments, the base station 240 is similar to the base station 130 (FIG. 1). In some embodiments, the UE 250 is similar to the UE 140 (FIG. 1).

In operation 210a, the CM change manager 210 instructs the distributed unit 230 to implement a default beamforming arrangement. In some embodiments, the instruction is transmitted wirelessly. In some embodiments, the instruction is transmitted via a wired connection. In some embodiments, the default beamforming arrangement includes a highest power consumption beamforming arrangement that provides a highest rate of data transfer between the base station 240 and the UE 250, such as a mobile phone. In some embodiments, the default beamforming arrangement includes an intermediate power consumption beamforming arrangement that provides an intermediate rate of data transfer between the base station 240 and the UE 250. In some embodiments, the default beamforming arrangement includes a lowest power consumption beamforming arrangement that provides a lowest rate of data transfer between the base station 240 and the UE 250. The description of the telecommunication network 200 will be based on an example of the default beamforming arrangement being the highest power consumption beamforming arrangement. However, one of ordinary skill in the art would understand how to modify the operations of the CM change manager 210, the PM manager 220 and the distributed unit 230 in order to implement an operation scheme with either the intermediate power consumption beamforming arrangement or the lowest power consumption beamforming arrangement as the default beamforming arrangement.

In operation 220a, the PM manager 220 is configured to supply KPI data to the distributed unit 230. In some embodiments, the KPI data is transmitted wirelessly. In some embodiments, the KPI data is transmitted via a wired connection. The PM manager 230 is configured to monitor performance of the base station 240 in order to collect KPI data. In some embodiments, the PM manager 230 is also configured to instruct the distributed unit 230 to collect KPI data from the UE 250, e.g., through an application installed on the UE 250. In some embodiments, the KPI data includes information related to one or more of physical resource blocks (PRB), radio resource control (RRC), reference signal received power (RSRP), reference signal received quality (RSRQ), block error rate (BLER), timing advance (TA), or other suitable KPIs. In some embodiments, the PM manager 220 transmits only some of the KPI data to the distributed unit 230. That is, only the KPI data related to monitored KPIs that are used to determine whether to adjust a beamforming arrangement of the base station 240 are transmitted to the distributed unit 230 in operation 220a, in some embodiments. In some embodiments, additional KPI data that is not transmitted to the distributed unit 230 is stored by the PM manager 230 or transmitted by the PM manager 230 to other devices within the telecommunication network 200 for other analysis and network monitoring operations.

In operation 230a, the distributed unit 230 is configured to receive the KPI data from the PM manager 220 and determine whether all of the monitored KPIs are below a corresponding first threshold value. The first threshold value for each KPI is determined independently from the first threshold values for other KPIs. In some embodiments, a number of KPIs considered in operation 230a is a single KPI. In some embodiments, multiple KPIs are considered in operation 230a.

Sample first threshold values for potential KPIs are discussed below. These examples are not exhaustive and other KPIs are within the scope of this description.

In some embodiments, a first threshold value for PRB ranges from about 5% to about 30%. The PRB threshold indicates a percentage of the available PRB for the base station that is currently being utilized. A decrease in PRB utilization indicates a smaller number of UEs 250 connected to the base station 240 or smaller amounts of data exchanged between the UEs 250 and the base station 240. In either situation, a low PRB indicates low utilization of the base station 240. A low utilization of the base station indicates that a reduction in power consumption is possible without significantly impacting quality of service (QOS) to the UEs 250. If the first threshold for the PRB is too high, then a risk of providing low QoS to the UEs 250 and decreased customer satisfaction increases, in some instances. If the first threshold for the PRB is too low, then power consumption reduction is less likely and operating costs for the telecommunication network 200 are not reduced in as many available situations, in some instances.

In some embodiments, a first threshold value for RRC ranges from about 2 to about 10. RRC is an indication of a number of UEs 250 currently connected to the base station 240. A decrease in RRC indicates a decrease in the utilization of the base station. If the first threshold for the RRC is too high, then a risk of providing low QoS to the UEs 250 and decreased customer satisfaction increases, in some instances. If the first threshold for the RRC is too low, then power consumption reduction is less likely and operating costs for the telecommunication network 200 are not reduced in as many available situations, in some instances.

In some embodiments, a first threshold value for RSRP ranges from about −70 decibel-milliwatts (dBm) to about −90 dBm. RSRP is an indication of a received power at the UE 250 from the base station 240. An increase in RSRP indicates the UE 250 is receiving sufficient power from the base station 240 to potentially permit a lowering of the power consumption by the base station 240 without significantly impacting the QoS to the UE 250. If the first threshold for the RSRP is too high, i.e., closer to 0, then power consumption reduction is less likely and operating costs for the telecommunication network 200 are not reduced in as many available situations, in some instances. If the first threshold for the RSRP is too low, i.e., farther from 0, then a risk of providing low QoS to the UEs 250 and decreased customer satisfaction increases, in some instances.

In some embodiments, a first threshold value for RSRQ ranges from about −9 decibels (dB) to about −11 dB. RSRQ is an indication of signal quality at the UE 250 from the base station 240. An increase in RSRQ indicates the UE 250 is receiving sufficient signal quality from the base station 240 to potentially permit a lowering of the power consumption by the base station 240 without significantly impacting the QoS to the UE 250. If the first threshold for the RSRQ is too high, i.e., closer to 0, then power consumption reduction is less likely and operating costs for the telecommunication network 200 are not reduced in as many available situations, in some instances. If the first threshold for the RSRQ is too low, i.e., farther from 0, then a risk of providing low QoS to the UEs 250 and decreased customer satisfaction increases, in some instances.

In some embodiments, a first threshold value for TA ranges from about 0 steps to about 2 steps. A step represents an advance of one bit period for the connection between the UE 250 and the base station 240. In some embodiments, the bit period is approximately 3.69 microseconds (ms). TA is an indication of a length of time for a signal to reach the base station 240 from the UE 250, which is also an indication of a distance between the UE 250 and the base station 240. A decrease in TA indicates a UE 250 is closer to the base station 240 and that power consumption at the base station 240 is less likely to significantly reduce QoS for the UE 250. If the first threshold for the TA is too high, then a risk of providing low QoS to the UEs 250 and decreased customer satisfaction increases, in some instances. If the first threshold for the TA is too low, then power consumption reduction is less likely and operating costs for the telecommunication network 200 are not reduced in as many available situations, in some instances.

In some embodiments, a first threshold value for BLER is less than about 10%. BLER is an indication of in-sync and out-of-sync for a connection between the UE 250 and the base station 240, i.e., a percentage of failed transmissions between the UE 250 and the base station 240. A decrease in BLER indicates a highly in-sync connection between the UE 250 and the base station 240 that increases the ability to lower power consumption by the base station 240 without significantly impacting the QoS for the UE 250. If the first threshold for the BLER is too high, then a risk of providing low QoS to the UEs 250 and decreased customer satisfaction increases, in some instances.

In operation 230a, the distributed unit determines whether all of the monitored KPIs are below a corresponding first threshold value. If any single monitored KPI is not below the corresponding first threshold value, then the determination in the operation 230a is "No," and the disturbed unit 230 proceeds to operation 230b. If all of the monitored KPIs are below the corresponding first threshold values, then the determination in the operation 230a is "Yes," and the distributed unit 230 proceeds to operation 230c.

The following example utilizes monitored KPIs of PRB, RRC and RSRP. One of ordinary skill in the art would understand that the use of these monitored KPIs is merely exemplary and that the use of additional, alternative, or fewer monitored KPIs are within the scope of this description. In a situation where the PRB is determined to be below the first threshold value for PRB; the RRC is determined to be above the first threshold value for RRC; and the RSRP is determined to be below the first threshold value for RSRP, the distributed unit 230 would proceed to operation 230b because the RRC value is not below the corresponding first threshold value for the RRC. Conversely, in a situation where the PRB is determined to be below the first threshold value for PRB; the RRC is determined to be below the first threshold value for RRC; and the RSRP is determined to be below the first threshold value for RSRP, the distributed unit 230 would proceed to operation 230c because all of the monitored KPIs are below the corresponding first threshold values.

In operation 230b, the distributed unit 230 determines that the default beamforming arrangement is to be maintained.

In operation 210b, the distributed unit 230 transmits a notification to the CM change manger 210 to confirm that the default beamforming arrangement will be maintained. In some embodiments, the notification is transmitted wirelessly. In some embodiments, the notification is transmitted via a wired connection.

In operation 230c, the distributed unit 230 is configured to receive the KPI data from the PM manager 220 and determine whether all of the monitored KPIs are below a corresponding second threshold value. The second threshold value for each KPI is determined independently from the second threshold values for other KPIs. In some embodiments, a number of KPIs considered in operation 230c is a single KPI. In some embodiments, multiple KPIs are considered in operation 230c.

Sample second threshold values for potential KPIs are discussed below. These examples are not exhaustive and other KPIs are within the scope of this description.

In some embodiments, a second threshold value for PRB ranges from about 5% to about 15%. If the second threshold for the PRB is too high, then a risk of providing low QoS to the UEs 250 and decreased customer satisfaction increases, in some instances. If the second threshold for the PRB is too low, then power consumption reduction is less likely and operating costs for the telecommunication network 200 are not reduced in as many available situations, in some instances.

In some embodiments, a second threshold value for RRC ranges from about 2 to about 4. If the second threshold for the RRC is too high, then a risk of providing low QoS to the UEs 250 and decreased customer satisfaction increases, in some instances. If the second threshold for the RRC is too low, then power consumption reduction is less likely and operating costs for the telecommunication network 200 are not reduced in as many available situations, in some instances.

In some embodiments, a second threshold value for RSRP ranges from about −70 dBm to about −80 dBm. If the second threshold for the RSRP is too high, i.e., closer to 0, then power consumption reduction is less likely and operating costs for the telecommunication network 200 are not reduced in as many available situations, in some instances. If the second threshold for the RSRP is too low, i.e., farther from 0, then a risk of providing low QoS to the UEs 250 and decreased customer satisfaction increases, in some instances.

In some embodiments, a second threshold value for RSRQ ranges from about −9 dB to about −10 dB. If the second threshold for the RSRQ is too high, i.e., closer to 0, then power consumption reduction is less likely and operating costs for the telecommunication network 200 are not reduced in as many available situations, in some instances. If the second threshold for the RSRQ is too low, i.e., farther from 0, then a risk of providing low QoS to the UEs 250 and decreased customer satisfaction increases, in some instances.

In some embodiments, a second threshold value for TA ranges from about 0 steps to about 1 step. If the second threshold for the TA is too high, then a risk of providing low QoS to the UEs 250 and decreased customer satisfaction increases, in some instances. If the second threshold for the TA is too low, then power consumption reduction is less likely and operating costs for the telecommunication network 200 are not reduced in as many available situations, in some instances.

In some embodiments, a second threshold value for BLER is less than about 8%. If the second threshold for the BLER is too high, then a risk of providing low QoS to the UEs 250 and decreased customer satisfaction increases, in some instances.

In operation 230c, the distributed unit determines whether all of the monitored KPIs are below a corresponding second threshold value. If any single monitored KPI is not below the corresponding second threshold value, then the determination in the operation 230c is "No," and the disturbed unit 230 proceeds to operation 230d. If all of the monitored KPIs are below the corresponding second threshold values, then the determination in the operation 230c is "Yes," and the distributed unit 230 proceeds to operation 230e.

The following example utilizes monitored KPIs of PRB, RRC and RSRP. One of ordinary skill in the art would understand that the use of these monitored KPIs is merely exemplary and that the use of additional, alternative, or fewer monitored KPIs are within the scope of this description. In a situation where the PRB is determined to be below the second threshold value for PRB; the RRC is determined to be below the first threshold value for RRC but not below the second threshold value; and the RSRP is determined to be below the second threshold value for RSRP, the distributed unit 230 would proceed to operation 230d because the RRC value is not below the corresponding second threshold value for the RRC. Conversely, in a situation where the PRB is determined to be below the second threshold value for PRB; the RRC is determined to be below the second threshold value for RRC; and the RSRP is determined to be below the second threshold value for RSRP, the distributed unit 230 would proceed to operation 230e because all of the monitored KPIs are below the corresponding second threshold values.

In operation 230d, the distributed unit 230 determines that the default beamforming arrangement should be switched to an intermediate power consumption beamforming arrangement.

In operation 210c, the distributed unit 230 transmits a notification to the CM change manger 210 to change the default beamforming arrangement to the intermediate power consumption beamforming arrangement. In some embodiments, the notification is transmitted wirelessly. In some embodiments, the notification is transmitted via a wired connection.

In operation 230e, the distributed unit 230 determines that the default beamforming arrangement should be switched to a low power consumption beamforming arrangement.

In operation 210d, the distributed unit 230 transmits a notification to the CM change manger 210 to change the default beamforming arrangement to the low power consumption beamforming arrangement. In some embodiments, the notification is transmitted wirelessly. In some embodiments, the notification is transmitted via a wired connection.

In operation 210e, the CM change manager 210 transmits an instruction to the distributed unit 230 to change the beamforming arrangement to either the intermediate power consumption beamforming arrangement or the low power consumption beamforming arrangement. The instruction from the CM change manager 210 is based on the notification received by the CM change manager 210 from the distributed unit 230. In some embodiments, the notification is transmitted wirelessly. In some embodiments, the notification is transmitted via a wired connection.

In operation 235a, the distributed unit 230 transmits an instruction to the base station 240 to implement the default beamforming arrangement. The instruction is used to control an operating voltage supplied to PAs connected to at least one antenna in the base station 240. As a result, the PAs are toggled between an ON state and an OFF state to implement beamforming for the base station 240. In the operation 235a, the default beamforming arrangement is a high power consumption arrangement having all antennae, e.g., transceivers, in the base station 240 operate with narrow beam signals to connect the base station 240 to the UE 250. In some embodiments, the notification is transmitted wirelessly. In some embodiments, the notification is transmitted via a wired connection.

In operation 235b, the distributed unit 230 transmits an instruction to the base station 240 to implement the intermediate power beamforming arrangement. The instruction is used to control an operating voltage supplied to PAs connected to at least one antenna in the base station 240. As a result, the PAs are toggled between an ON state and an OFF state to implement beamforming for the base station 240. In the operation 235b, the default beamforming arrangement is the intermediate power consumption arrangement having fewer antennae, e.g., transceivers, in the base station 240 operate to provide a broad beam signal to connect the base station 240 to the UE 250. In some embodiments, the notification is transmitted wirelessly. In some embodiments, the notification is transmitted via a wired connection.

In operation 235c, the distributed unit 230 transmits an instruction to the base station 240 to implement the low power beamforming arrangement. The instruction is used to control an operating voltage supplied to PAs connected to at least one antenna in the base station 240. As a result, the PAs are toggled between an ON state and an OFF state to implement beamforming for the base station 240. In the operation 235c, the default beamforming arrangement is the low power consumption arrangement having few antennae, e.g., transceivers, in the base station 240 operate with narrow beam signals to connect the base station 240 to the UE 250. Both operation 235a and operation 235c product narrow beam signals. However, as indicated in FIG. 2, a number of narrow beam signals output by the base station 240 in the low power beamforming arrangement is less than a number of narrow beam signals output by the base station 240 in the default beamforming arrangement. In some embodiments, the notification is transmitted wirelessly. In some embodiments, the notification is transmitted via a wired connection.

The telecommunication network 200 is described as having three different power beamforming arrangements. One of ordinary skill in the art would recognize that the use of three different power beamforming arrangements is merely exemplary. In some embodiments, the telecommunication network 200 has two different power beamforming arrangements. In some embodiments, the telecommunication network 200 has more than three different power beamforming arrangements.

Further, one of ordinary skill in the art would understand that the order of operations described with respect to the telecommunication network 200 is adjustable. For example, in some embodiments, the operation 230b is implemented prior to the operation 230a. One of ordinary skill in the art would understand that the telecommunication network 200 is capable of performing additional operations. For example, in some embodiments, the CM change manager 210 is configured to receive threshold values from a network monitor and to provide those threshold values to the distributed unit 230. One of ordinary skill in the art would understand that at least one operation of the telecommunication system 200 is omitted. For example, in some embodiments, the operations 230c and 230e are omitted in situations where the telecommunication network 200 includes only two different power beamforming arrangements.

Figure 3A:
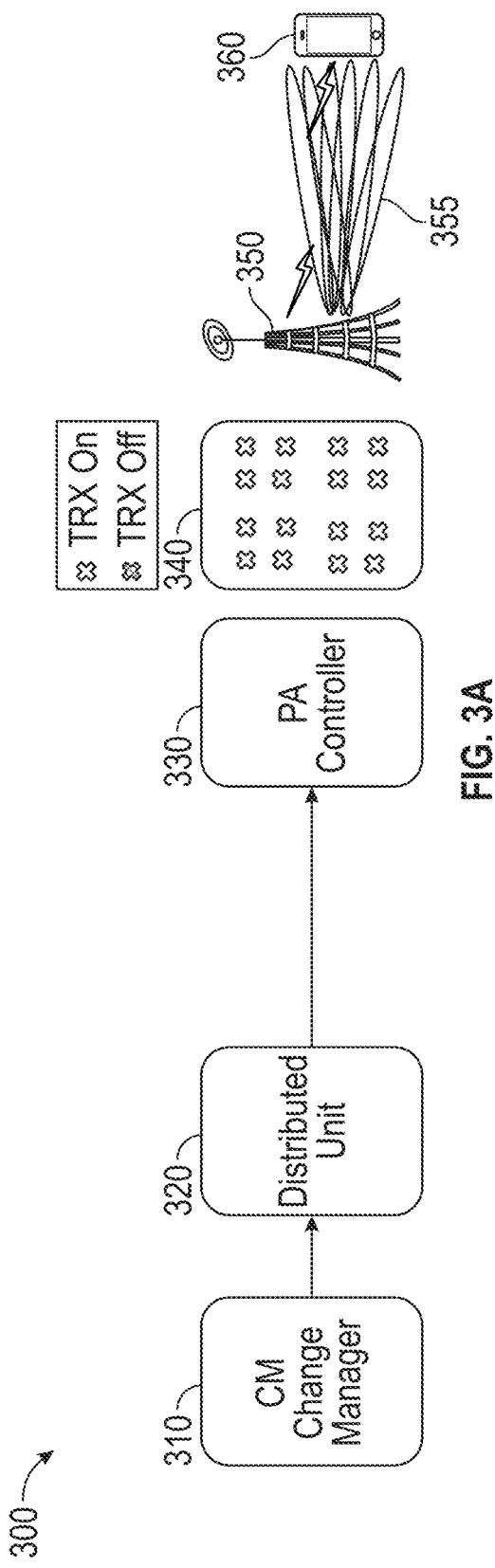
FIG. 3A is a view of a flow of operations for beamforming based on a first power level in accordance with some embodiments.

FIG. 3A is a view of a flow 300 of operations for beamforming based on a first power level in accordance with some embodiments. The flow 300 includes transmitting instructions from a CM change manager 310 to a distributed unit 320 to implement a beamforming arrangement that has a first power consumption. In some embodiments, the first power consumption is the default beamforming arrangement. The distributed unit 320 is configured to receive the instructions from the CM change manager and to instruct a PA controller 330 within a base station 350 to control PAs attached to an antenna array 340 to implement the beamforming arrangement at the first power level. Based on the ON/OFF state of the PAs attached to the antenna array 340, the base station 350 outputs multiple narrow beam signals 355 to connect to the UE 360. In some embodiments, the instructions are transmitted wirelessly. In some embodiments, the instructions are transmitted via a wired connection. In some embodiments, the CM change manager 310 is similar to the CM change manager 210 (FIG. 2). In some embodiments, the distributed unit 320 is similar to the distributed unit 230 (FIG. 2). In some embodiments, the base station 350 is similar to the base station 240 (FIG. 2). In some embodiments, the UE 360 is similar to the UE 250 (FIG. 2). In some embodiments, the flow 300 is configured to produce a similar beamforming arrangement as operation 235a (FIG. 2).

Figure 3C:
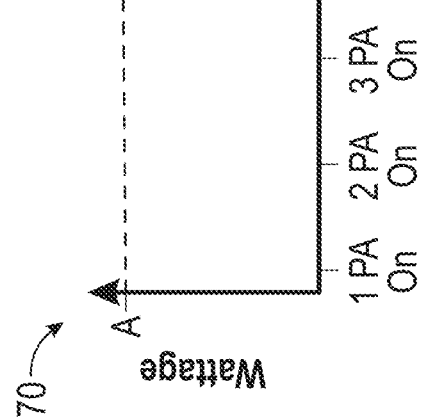
FIG. 3C is a graph of a power consumption of an antenna performing beamforming based on the first power level in accordance with some embodiments.
Figure 3B:
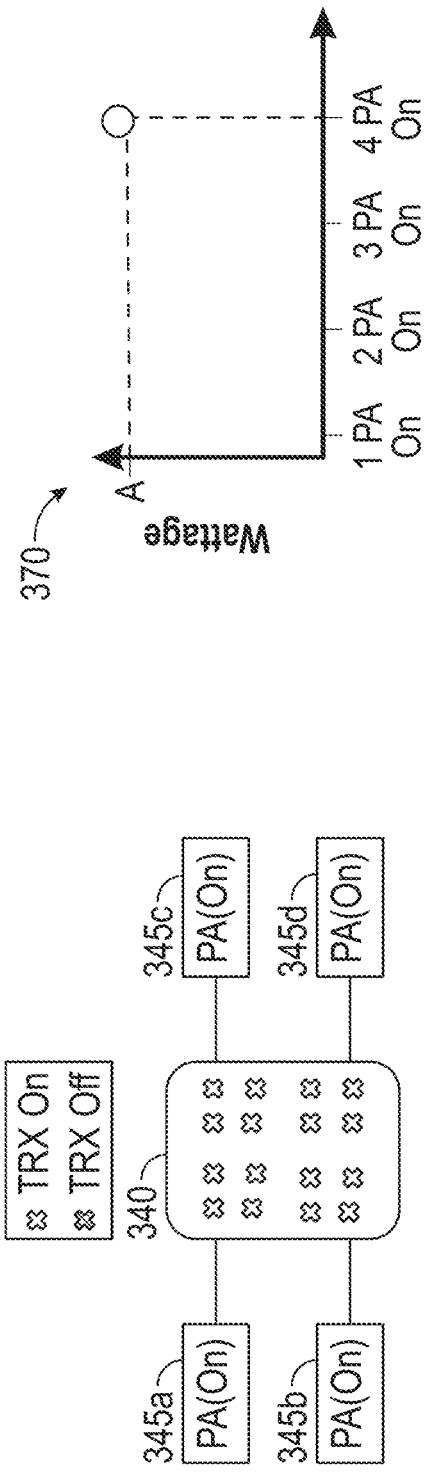
FIG. 3B is a schematic view of an antenna performing beamforming based on the first power level in accordance with some embodiments.

FIG. 3B is a schematic view of an antenna array 340 performing beamforming based on the first power level in accordance with some embodiments. Several PAs 345a, 345b, 345c and 345d are connected to the antenna array 340 to control power provided to individual transceivers, TRX, within the antenna array 340. In FIG. 3B, all of the PAs 345a, 345b, 345c and 345d are in the ON state. As a result, all of the transceivers in the antenna array 340 are ON and multiple narrow beam signals are output from the base station. One of ordinary skill in the art would understand that the number of PAs 345 connected to the antenna array 340 is merely exemplary. In some embodiments, more than four PAs are connected to the antenna array 340. In some embodiments, fewer than four PAs are connected to the antenna array 340. One of ordinary skill in the art would also understand that the number and arrangement of transceivers in the antenna array are exemplary. In some embodiments, the antenna array 340 has a different number of transceivers or a different arrangement of transceivers.

FIG. 3C is a graph 370 of a power consumption of an antenna performing beamforming based on the first power level in accordance with some embodiments. The graph 370 indicates that 4 PAs are in the ON state; and that the power consumption is a wattage level A. For the sake of brevity, the graph 370 is not intended to provide precise power consumption values and is used to provide a thematic understanding of the power consumed by the first power level beamforming arrangement.

FIG. 4A is a view of a flow 400 of operations for beamforming based on a second power level in accordance with some embodiments. The flow 400 includes transmitting instructions from a CM change manager 310 to a distributed unit 320 to implement a beamforming arrangement that has a second power consumption. The second power consumption is less than the first power consumption. The distributed unit 320 is configured to receive the instructions from the CM change manager and to instruct a PA controller 330 within a base station 350 to control PAs attached to an antenna array 340 to implement the beamforming arrangement at the second power level. Based on the ON/OFF state of the PAs attached to the antenna array 340, the base station 350 outputs a broad beam signal 455 to connect to the UE 360. In some embodiments, the instructions are transmitted wirelessly. In some embodiments, the instructions are transmitted via a wired connection. In some embodiments, the flow 400 is configured to produce a similar beamforming arrangement as operation 235b (FIG. 2).

FIG. 4B is a schematic view of an antenna performing beamforming based on the second power level in accordance with some embodiments. Several PAs 345a, 345b, 345c and 345d are connected to the antenna array 340 to control power provided to individual transceivers, TRX, within the antenna array 340. In FIG. 4B, the PA 345d is OFF and the PAs 345a, 345b and 345c are in the ON state. As a result, less than all of the transceivers in the antenna array 340 are ON and a broad beam signal is output from the base station. One of ordinary skill in the art would also understand that the number and arrangement of transceivers in the antenna array that are ON to produce the broad beam signal are exemplary. In some embodiments, a different number of transceivers or a different arrangement of transceivers is used in the antenna array 340 to produce the broad beam signal.

FIG. 4C is a graph 470 of a power consumption of an antenna performing beamforming based on the second power level in accordance with some embodiments. The graph 470 indicates that 3 PAs are in the ON state; and that the power consumption is a wattage level B. The wattage level B is less than the wattage level A of FIG. 3C indicating that the amount of power consumed when the base station outputs a broad beam signal, as in FIG. 4A, is less than an amount of power consumed when the base station outputs many narrow beam signals, as in FIG. 3A. For the sake of brevity, the graph 470 is not intended to provide precise power consumption values and is used to provide a thematic understanding of the power consumed by the second power level beamforming arrangement.

FIG. 5A is a view of a flow 500 of operations for beamforming based on a third power level in accordance with some embodiments. The flow 500 includes transmitting instructions from a CM change manager 310 to a distributed unit 320 to implement a beamforming arrangement that has a third power consumption. The third power consumption is less than the second power consumption. The distributed unit 320 is configured to receive the instructions from the CM change manager and to instruct a PA controller 330 within a base station 350 to control PAs attached to an antenna array 340 to implement the beamforming arrangement at the third power level. Based on the ON/OFF state of the PAs attached to the antenna array 340, the base station 350 outputs fewer narrow beam signals 555 than the first power level, i.e., narrow beam signals 355, to connect to the UE 360. In some embodiments, the instructions are transmitted wirelessly. In some embodiments, the instructions are transmitted via a wired connection. In some embodiments, the flow 500 is configured to produce a similar beamforming arrangement as operation 235c (FIG. 2).

FIG. 5B is a schematic view of an antenna performing beamforming based on the third power level in accordance with some embodiments. Several PAs 345*a*, 345*b*, 345*c* and 345*d* are connected to the antenna array 340 to control power provided to individual transceivers, TRX, within the antenna array 340. In FIG. 5B, the PAs 345*b* and 345*d* are OFF and the PAs 345*a* and 345*c* are in the ON state. As a result, less than all of the transceivers in the antenna array 340 are ON and fewer narrow beam signals are output from the base station in comparison with FIG. 3B. One of ordinary skill in the art would also understand that the number and arrangement of transceivers in the antenna array that are ON to produce fewer narrow beam signals are exemplary. In some embodiments, a different number of transceivers or a different arrangement of transceivers is used in the antenna array 340 to produce fewer narrow beam signals.

FIG. 5C is a graph 570 of a power consumption of an antenna performing beamforming based on the third power level in accordance with some embodiments. The graph 570 indicates that 2 PAs are in the ON state; and that the power consumption is a wattage level C. The wattage level C is less than the wattage level B of FIG. 4C indicating that the amount of power consumed when the base station outputs a broad beam signal, as in FIG. 4A, is greater than an amount of power consumed when the base station outputs few narrow beam signals, as in FIG. 5A. For the sake of brevity, the graph 570 is not intended to provide precise power consumption values and is used to provide a thematic understanding of the power consumed by the third power level beamforming arrangement.

Figure 6:
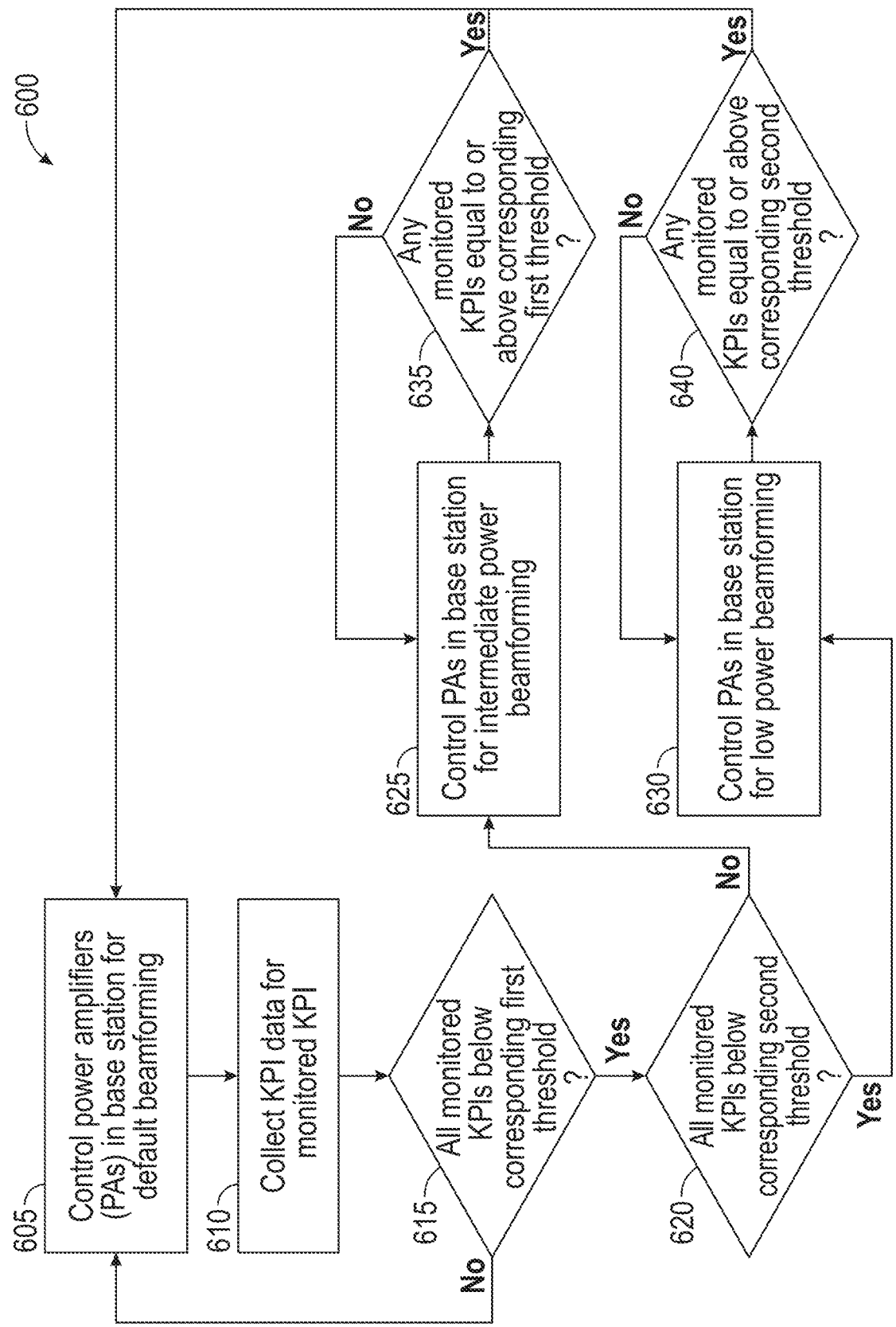
FIG. 6 is a flowchart of a method of beamforming in accordance with some embodiments.

FIG. 6 is a flowchart of a method 600 of beamforming in accordance with some embodiments. In some embodiments, the method 600 is implemented using the telecommunication network 100 (FIG. 1). In some embodiments, the method 600 is implemented using the telecommunication network 200 (FIG. 2). In some embodiments, the method 600 is implemented using a telecommunication network other than the telecommunication network 100 (FIG. 1) or the telecommunication network 200 (FIG. 2).

In operation 605, PAs in a base station are controlled for default beamforming. In some embodiments, the default beamforming is a highest power consumption beamforming. In some embodiments, the default beamforming is a lower power consumption beamforming. In some embodiments, the default beamforming is an intermediate power consumption beamforming. The description of the method 600 will be based on an example where the default beamforming is the highest power consumption beamforming. One of ordinary skill in the art would understand how to modify the method 600 for embodiments where the default beamforming is the intermediate power consumption beamforming or the lowest power consumption beamforming. The PAs are controlled by controlling an operating voltage supplied to individual PAs in order to selectively turn each PA ON or OFF. Based on which PAs are ON and which PAs are OFF, power to transceivers within an antenna array in the base station are set into an ON state or an OFF state to cause the base station to output the default beamforming signal. In some embodiments, the default beamforming includes multiple narrow beam signals.

In operation 610, KPI data is collected for monitored KPIs. In some embodiments, the KPI data is collected from equipment within the telecommunication network. In some embodiments, the KPI data is collected from a UE connected to the telecommunication network. In some embodiments, the KPI data is collected using both equipment connected to the telecommunication network and at least one UE connected to the telecommunication network. In some embodiments, only data for the monitored KPIs is collected. In some embodiments, data for more KPIs than the monitored KPIs are collected for use in other operations, e.g., network monitoring, within the telecommunication network. In some embodiments, the KPI data is collected using a PM manager, e.g., PM manager 220 (FIG. 2). In some embodiments, the KPI data includes information related to one or more of physical resource blocks (PRB), radio resource control (RRC), reference signal received power (RSRP), reference signal received quality (RSRQ), block error rate (BLER), timing advance (TA), or other suitable KPIs.

In operation 615, a determination is made regarding whether all of the monitored KPIs are below a corresponding first threshold. In some embodiments, the operation 615 is similar to the operation 235*a*, and a detailed description of the operation 615 is omitted for the sake of brevity. In response to a determination that all of the monitored KPIs are below the corresponding first thresholds, the method 600 proceeds to operation 620. In response to a determination that at least one of the monitored KPIs is equal to or above the corresponding first threshold, the method 600 returns to operation 605.

In operation 620, a determination is made regarding whether all of the monitored KPIs are below a corresponding second threshold. In some embodiments, the operation 620 is similar to the operation 235*c*, and a detailed description of the operation 620 is omitted for the sake of brevity. In response to a determination that all of the monitored KPIs are below the corresponding second thresholds, the method 600 proceeds to operation 630. In response to a determination that at least one of the monitored KPIs is equal to or above the corresponding second threshold, the method 600 proceeds to operation 625.

In operation 625, the PAs in the base station are controlled for outputting intermediate power beamforming. In some embodiments, the intermediate power beamforming includes a broad beam signal. The PAs are controlled by controlling an operating voltage supplied to individual PAs in order to selectively turn each PA ON or OFF. Based on which PAs are ON and which PAs are OFF, power to transceivers within an antenna array in the base station are set into an ON state or an OFF state to cause the base station to output the intermediate power beamforming signal.

In operation 630, the PAs in the base station are controlled for outputting low power beamforming. In some embodiments, the low power beamforming includes a single narrow beam signal. In some embodiments, the low power beamforming includes a few narrow beam signals, but less narrow beam signal than output based on operation 605. The PAs are controlled by controlling an operating voltage supplied to individual PAs in order to selectively turn each PA ON or OFF. Based on which PAs are ON and which PAs are OFF, power to transceivers within an antenna array in the base station are set into an ON state or an OFF state to cause the base station to output the low power beamforming signal.

In operation 635, a determination is made regarding whether any of the monitored KPIs are equal to or above the corresponding first threshold. In some embodiments, the determination in operation 635 is similar to the determination in operation 615. In response to a determination that none of the monitored KPIs are equal to or above the corresponding first threshold, the method 600 returns to operation 625. In response to a determination that at least one of the monitored KPIs is equal to or above the corresponding first threshold, the method 600 returns to operation 605.

In operation 640, a determination is made regarding whether any of the monitored KPIs are equal to or above the corresponding second threshold. In some embodiments, the determination in operation 640 is similar to the determination in operation 620. In response to a determination that none of the monitored KPIs are equal to or above the corresponding second threshold, the method 600 returns to operation 630. In response to a determination that at least one of the monitored KPIs is equal to or above the corresponding second threshold, the method 600 returns to operation 605. In some embodiments, in response to a determination that at least one of the monitored KPIs is equal to or above the corresponding second threshold, the method 600 proceeds to operation 635 instead of returning direction to operation 605.

One of ordinary skill in the art would recognize that in some embodiments additional operations are performed in the method 600. For example, in some embodiments, the method 600 further includes receiving information from a network monitor regarding a value of the first threshold or the second threshold for one or more of the monitored KPIs. One of ordinary skill in the art would recognize that in some embodiment, at least one of the operations of the method 600 is omitted. For example, in some embodiments, the operations 620, 630 and 640 are omitted where the method 600 is used to switch between only two power consumption beamforming arrangements. One of ordinary skill in the art would recognize that in some embodiments an order of operations of the method 600 is adjusted. For example, in some embodiments, the operation 610 is performed prior to the operation 605.

Figure 7:
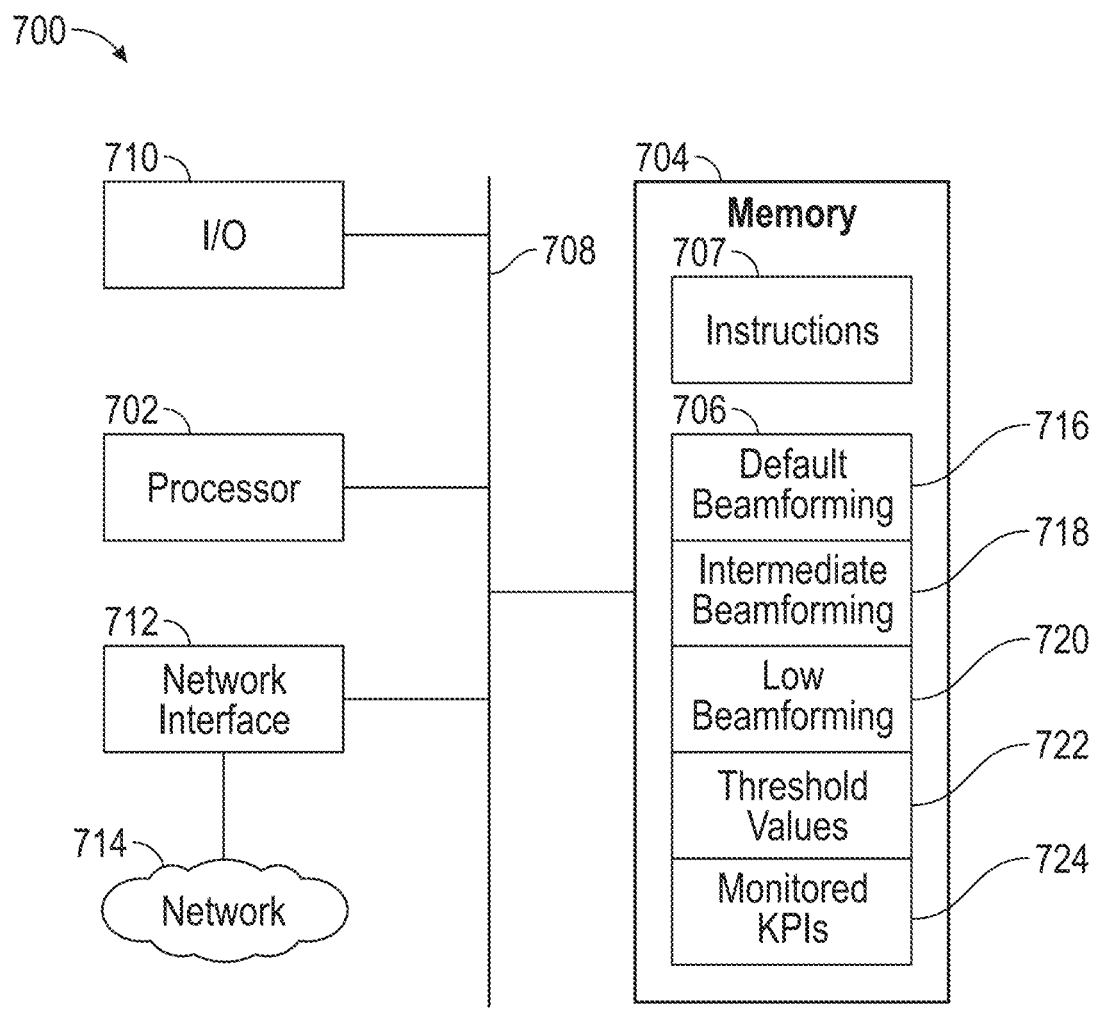
FIG. 7 is a block diagram of a system for performing beam forming in accordance with some embodiments.

FIG. 7 is a block diagram of a system 700 for implementing beamforming in accordance with some embodiments. System 700 includes a hardware processor 702 and a non-transitory, computer readable storage medium 704 encoded with, i.e., storing, the computer program 1 code 706, i.e., a set of executable instructions. Computer readable storage medium 704 is also encoded with instructions 707 for interfacing with external devices. The processor 702 is electrically coupled to the computer readable storage medium 704 via a bus 708. The processor 702 is also electrically coupled to an I/O interface 710 by bus 708. A network interface 712 is also electrically connected to the processor 702 via bus 708. Network interface 712 is connected to a network 714, so that processor 702 and computer readable storage medium 704 are capable of connecting to external elements via network 714. The processor 702 is configured to execute the computer program code 706 encoded in the computer readable storage medium 704 in order to cause system 700 to be usable for performing a portion or all of the operations as described in telecommunication system 100 (FIG. 1), telecommunication system 200 (FIG. 2), flow 300 (FIG. 3A), flow 400 (FIG. 4A), flow 500 (FIG. 5A), or method 600 (FIG. 6).

In some embodiments, the processor 702 is a central processing unit (CPU), a multi-processor, a distributed processing system, an application specific integrated circuit (ASIC), and/or a suitable processing unit.

In some embodiments, the computer readable storage medium 704 is an electronic, magnetic, optical, electromagnetic, infrared, and/or a semiconductor system (or apparatus or device). For example, the computer readable storage medium 704 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 704 includes a compact disk-read only memory (CD-ROM), a compact disk-read/write (CD-R/W), and/or a digital video disc (DVD).

In some embodiments, the storage medium 704 stores the computer program code 706 configured to cause system 700 to perform a portion or all of the operations as described in telecommunication system 100 (FIG. 1), telecommunication system 200 (FIG. 2), flow 300 (FIG. 3A), flow 400 (FIG. 4A), flow 500 (FIG. 5A), or method 600 (FIG. 6). In some embodiments, the storage medium 704 also stores information for performing a portion or all of the operations as described in telecommunication system 100 (FIG. 1), telecommunication system 200 (FIG. 2), flow 300 (FIG. 3A), flow 400 (FIG. 4A), flow 500 (FIG. 5A), or method 600 (FIG. 6) as well as information generated during performing a portion or all of the operations as described in telecommunication system 100 (FIG. 1), telecommunication system 200 (FIG. 2), flow 300 (FIG. 3A), flow 400 (FIG. 4A), flow 500 (FIG. 5A), or method 600 (FIG. 6), such as a default beamforming parameter 716, an intermediate beamforming parameter 718, a low beamforming parameter 720, a threshold values parameter 722, a monitored KPIs parameter 724 and/or a set of executable instructions to perform a portion or all of the operations as described in telecommunication system 100 (FIG. 1), telecommunication system 200 (FIG. 2), flow 300 (FIG. 3A), flow 400 (FIG. 4A), flow 500 (FIG. 5A), or method 600 (FIG. 6).

In some embodiments, the storage medium 704 stores instructions 707 for interfacing with external devices. The instructions 707 enable processor 702 to generate and receive instructions readable by the external devices to effectively perform a portion or all of the operations as described in telecommunication system 100 (FIG. 1), telecommunication system 200 (FIG. 2), flow 300 (FIG. 3A), flow 400 (FIG. 4A), flow 500 (FIG. 5A), or method 600 (FIG. 6).

System 700 includes I/O interface 710. I/O interface 710 is coupled to external circuitry. In some embodiments, I/O interface 710 includes a keyboard, keypad, mouse, trackball, trackpad, and/or cursor direction keys for communicating information and commands to processor 702.

System 700 also includes network interface 712 coupled to the processor 702. Network interface 712 allows system 700 to communicate with network 714, to which one or more other computer systems are connected. Network interface 712 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described in telecommunication system 100 (FIG. 1), telecommunication system 200 (FIG. 2), flow 300 (FIG. 3A), flow 400 (FIG. 4A), flow 500 (FIG. 5A), or method 600 (FIG. 6) is implemented in two or more systems 700, and information is exchanged between different systems 700 via network 714.

An aspect of this description relates to a method of beamforming in a telecommunication network. The method includes controlling an antenna array in a base station to output a default beamforming signal, wherein outputting the default beamforming signal consumes a first amount of power. The method further includes collecting key performance indicator (KPI) data for a plurality of KPIs associated with telecommunication network. The method further includes determining whether each of the plurality of KPIs has a value below a corresponding first threshold of a plurality of first thresholds. The method further includes controlling the antenna array in the base station to output a second beamforming signal, different from the first beamforming signal, in response to a determination that the value of each of the plurality of KPIs is below the corresponding first threshold of the plurality of first thresholds, wherein outputting the second beamforming signal consumes a second amount of power different from the first amount of power. In some embodiments, the method further includes controlling the antenna array in the base station to continue to output the default beamforming signal in response to the value of at least one KPI of the plurality of KPIs being equal to above the corresponding first threshold of the plurality of first thresholds. In some embodiments, the method further includes determining whether each of the plurality of KPIs has a value below a corresponding second threshold of a plurality of second thresholds; and determining whether the value of each of the plurality of KPIs has is below the corresponding first threshold of the plurality of first thresholds in response to determining that each of the value of each of the plurality of KPIs is below the corresponding second threshold of the plurality of second thresholds. In some embodiments, the method further includes controlling the antenna array in the base station to output a third beamforming signal, different from the first beamforming signal and the second beamforming signal, in response to a determination that the value of each of the plurality of KPIs is below the corresponding second threshold of the plurality of second thresholds, wherein outputting the third beamforming signal consumes a third amount of power different from the first amount of power and the second amount of power. In some embodiments, the third amount of power is greater than the second amount of power, and the third amount of power is less than the first amount of power. In some embodiments, controlling the antenna array in the base station to output the default beamforming signal includes controlling the antenna array to output multiple narrow beam signals. In some embodiments, controlling the antenna array in the base station to output the second beamforming signal includes controlling the antenna array to output a broad beam signal. In some embodiments, collecting the KPI data includes collecting KPI data for a plurality of physical resource blocks (PRB), radio resource control (RRC), reference signal received power (RSRP), reference signal received quality (RSRQ), block error rate (BLER), or timing advance (TA).

An aspect of this description relates to a system for beamforming in a telecommunication network. The system includes a non-transitory computer readable medium configured to store instructions thereon. The system further includes a processor connected to the non-transitory computer readable medium. The processor is configured to execute the instructions for controlling an antenna array in a base station to output a default beamforming signal, wherein outputting the default beamforming signal consumes a first amount of power. The processor is configured to execute the instructions for collecting key performance indicator (KPI) data for a plurality of KPIs associated with telecommunication network. The processor is configured to execute the instructions for determining whether each of the plurality of KPIs has a value below a corresponding first threshold of a plurality of first thresholds. The processor is configured to execute the instructions for controlling the antenna array in the base station to output a second beamforming signal, different from the first beamforming signal, in response to a determination that the value of each of the plurality of KPIs is below the corresponding first threshold of the plurality of first thresholds, wherein outputting the second beamforming signal consumes a second amount of power different from the first amount of power. In some embodiments, the processor is further configured to execute the instructions for controlling the antenna array in the base station to continue to output the default beamforming signal in response to the value of at least one KPI of the plurality of KPIs being equal to above the corresponding first threshold of the plurality of first thresholds. In some embodiments, the processor is further configured to execute the instructions for determining whether each of the plurality of KPIs has a value below a corresponding second threshold of a plurality of second thresholds; and determining whether the value of each of the plurality of KPIs has is below the corresponding first threshold of the plurality of first thresholds in response to determining that each of the value of each of the plurality of KPIs is below the corresponding second threshold of the plurality of second thresholds. In some embodiments, the processor is further configured to execute the instructions for controlling the antenna array in the base station to output a third beamforming signal, different from the first beamforming signal and the second beamforming signal, in response to a determination that the value of each of the plurality of KPIs is below the corresponding second threshold of the plurality of second thresholds, wherein outputting the third beamforming signal consumes a third amount of power different from the first amount of power and the second amount of power. In some embodiments, the third amount of power is greater than the second amount of power, and the third amount of power is less than the first amount of power. In some embodiments, the processor is further configured to execute the instructions for controlling the antenna array in the base station to output the default beamforming signal by controlling the antenna array to output multiple narrow beam signals. In some embodiments, the processor is further configured to execute the instructions for controlling the antenna array in the base station to output the second beamforming signal by controlling the antenna array to output a broad beam signal. In some embodiments, the processor is further configured to execute the instructions for collecting the KPI data by collecting KPI data for a plurality of physical resource blocks (PRB), radio resource control (RRC), reference signal received power (RSRP), reference signal received quality (RSRQ), block error rate (BLER), or timing advance (TA).

An aspect of this description relates to a non-transitory medium configured to store instructions for causing a processor to control an antenna array in a base station to output a default beamforming signal, wherein outputting the default beamforming signal consumes a first amount of power. The instructions are further configured to cause the processor to collect key performance indicator (KPI) data for a plurality of KPIs associated with telecommunication network. The instructions are further configured to cause the processor to determine whether each of the plurality of KPIs has a value below a corresponding first threshold of a plurality of first thresholds. The instructions are further configured to cause the processor to control the antenna array in the base station to output a second beamforming signal, different from the first beamforming signal, in response to a determination that the value of each of the plurality of KPIs is below the corresponding first threshold of the plurality of first thresholds, wherein outputting the second beamforming signal consumes a second amount of power different from the first amount of power. In some embodiments, the instructions are further configured to cause the processor to control the antenna array in the base station to continue to output the default beamforming signal in response to the value of at least one KPI of the plurality of KPIs being equal to above the corresponding first threshold of the plurality of first thresholds. In some embodiments, the instructions are further configured to cause the processor to determining whether each of the plurality of KPIs has a value below a corresponding second threshold of a plurality of second thresholds; and determining whether the value of each of the plurality of KPIs has is below the corresponding first threshold of the plurality of first thresholds in response to determining that each of the value of each of the plurality of KPIs is below the corresponding second threshold of the plurality of second thresholds. In some embodiments, the instructions are further configured to cause the processor to collect the KPI data including a plurality of physical resource blocks (PRB), radio resource control (RRC), reference signal received power (RSRP), reference signal received quality (RSRQ), block error rate (BLER), or timing advance (TA).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of beamforming in a telecommunication network, the method comprising:
   controlling an antenna array in a base station to output a default beamforming signal, wherein the default beamforming signal consumes a first amount of power;
   collecting key performance indicator (KPI) data for a plurality of KPIs associated with the telecommunication network;
   determining whether each of the plurality of KPIs has a value below a corresponding first threshold of a plurality of first thresholds; and
   controlling the antenna array in the base station to output a second beamforming signal, different from the default beamforming signal, in response to a determination that the value of each of the plurality of KPIs is below the corresponding first threshold of the plurality of first thresholds, wherein the second beamforming signal consumes a second amount of power different from the first amount of power.

2. The method according to claim 1, further comprising:
   controlling the antenna array in the base station to continue to output the default beamforming signal in response to the value of at least one KPI of the plurality of KPIs being equal to above the corresponding first threshold of the plurality of first thresholds.

3. The method according to claim 1, further comprising:
   determining whether each of the plurality of KPIs has a value below a corresponding second threshold of a plurality of second thresholds; and
   determining whether the value of each of the plurality of KPIs is below the corresponding first threshold of the plurality of first thresholds in response to determining that each of the value of each of the plurality of KPIs is below the corresponding second threshold of the plurality of second thresholds.

4. The method according to claim 3, further comprising:
   controlling the antenna array in the base station to output a third beamforming signal, different from the default beamforming signal and the second beamforming signal, in response to a determination that the value of each of the plurality of KPIs is below the corresponding second threshold of the plurality of second thresholds, wherein the third beamforming signal consumes a third amount of power different from the first amount of power and the second amount of power.

5. The method according to claim 4, wherein the third amount of power is greater than the second amount of power, and the third amount of power is less than the first amount of power.

6. The method according to claim 1, wherein controlling the antenna array in the base station to output the default beamforming signal comprises controlling the antenna array to output multiple narrow beam signals.

7. The method according to claim 1, wherein controlling the antenna array in the base station to output the second beamforming signal comprises controlling the antenna array to output a broad beam signal.

8. The method according to claim 1, wherein collecting the KPI data comprises collecting KPI data for a plurality of physical resource blocks (PRB), radio resource control (RRC), reference signal received power (RSRP), reference signal received quality (RSRQ), block error rate (BLER), or timing advance (TA).

9. A system for beamforming in a telecommunication network, the system comprising:
   a non-transitory computer readable medium configured to store instructions thereon; and
   a processor connected to the non-transitory computer readable medium, wherein the processor is configured to execute the instructions for:
      controlling an antenna array in a base station to output a default beamforming signal, wherein the default beamforming signal consumes a first amount of power;
      collecting key performance indicator (KPI) data for a plurality of KPIs associated with the telecommunication network;
      determining whether each of the plurality of KPIs has a value below a corresponding first threshold of a plurality of first thresholds; and
      controlling the antenna array in the base station to output a second beamforming signal, different from the default beamforming signal, in response to a determination that the value of each of the plurality of KPIs is below the corresponding first threshold of the plurality of first thresholds, wherein the second beamforming signal consumes a second amount of power different from the first amount of power.

10. The system according to claim 9, wherein the processor is further configured to execute the instructions for:
    controlling the antenna array in the base station to continue to output the default beamforming signal in response to the value of at least one KPI of the plurality of KPIs being equal to above the corresponding first threshold of the plurality of first thresholds.

11. The system according to claim 9, wherein the processor is further configured to execute the instructions for:
    determining whether each of the plurality of KPIs has a value below a corresponding second threshold of a plurality of second thresholds; and
    determining whether the value of each of the plurality of KPIs is below the corresponding first threshold of the plurality of first thresholds in response to determining that each of the value of each of the plurality of KPIs is below the corresponding second threshold of the plurality of second thresholds.

12. The system according to claim 11, wherein the processor is further configured to execute the instructions for:
controlling the antenna array in the base station to output a third beamforming signal, different from the default beamforming signal and the second beamforming signal, in response to a determination that the value of each of the plurality of KPIs is below the corresponding second threshold of the plurality of second thresholds, wherein the third beamforming signal consumes a third amount of power different from the first amount of power and the second amount of power.

13. The system according to claim 12, wherein the third amount of power is greater than the second amount of power, and the third amount of power is less than the first amount of power.

14. The system according to claim 9, wherein the processor is further configured to execute the instructions for controlling the antenna array in the base station to output the default beamforming signal by controlling the antenna array to output multiple narrow beam signals.

15. The system according to claim 9, wherein the processor is further configured to execute the instructions for controlling the antenna array in the base station to output the second beamforming signal by controlling the antenna array to output a broad beam signal.

16. The system according to claim 9, wherein the processor is further configured to execute the instructions for collecting the KPI data by collecting KPI data for a plurality of physical resource blocks (PRB), radio resource control (RRC), reference signal received power (RSRP), reference signal received quality (RSRQ), block error rate (BLER), or timing advance (TA).

17. A non-transitory medium configured to store instructions for causing a processor to:
control an antenna array in a base station to output a default beamforming signal, wherein the default beamforming signal consumes a first amount of power;
collect key performance indicator (KPI) data for a plurality of KPIs associated with a telecommunication network;
determine whether each of the plurality of KPIs has a value below a corresponding first threshold of a plurality of first thresholds; and
control the antenna array in the base station to output a second beamforming signal, different from the default beamforming signal, in response to a determination that the value of each of the plurality of KPIs is below the corresponding first threshold of the plurality of first thresholds, wherein outputting the second beamforming signal consumes a second amount of power different from the first amount of power.

18. The non-transitory computer readable medium according to claim 17, wherein the instructions are further configured to cause the processor to:
control the antenna array in the base station to continue to output the default beamforming signal in response to the value of at least one KPI of the plurality of KPIs being equal to above the corresponding first threshold of the plurality of first thresholds.

19. The non-transitory computer readable medium according to claim 17, wherein the instructions are further configured to cause the processor to:
determining whether each of the plurality of KPIs has a value below a corresponding second threshold of a plurality of second thresholds; and
determining whether the value of each of the plurality of KPIs is below the corresponding first threshold of the plurality of first thresholds in response to determining that each of the value of each of the plurality of KPIs is below the corresponding second threshold of the plurality of second thresholds.

20. The non-transitory computer readable medium according to claim 17, wherein the instructions are further configured to cause the processor to collect the KPI data including a plurality of physical resource blocks (PRB), radio resource control (RRC), reference signal received power (RSRP), reference signal received quality (RSRQ), block error rate (BLER), or timing advance (TA).

* * * * *